Feb. 20, 1934.  G. A. LYON  1,948,273
ORNAMENTAL BEAD AND METHOD OF APPLYING SAME TO A WHEEL RIM
Filed Oct. 3, 1932  2 Sheets-Sheet 1
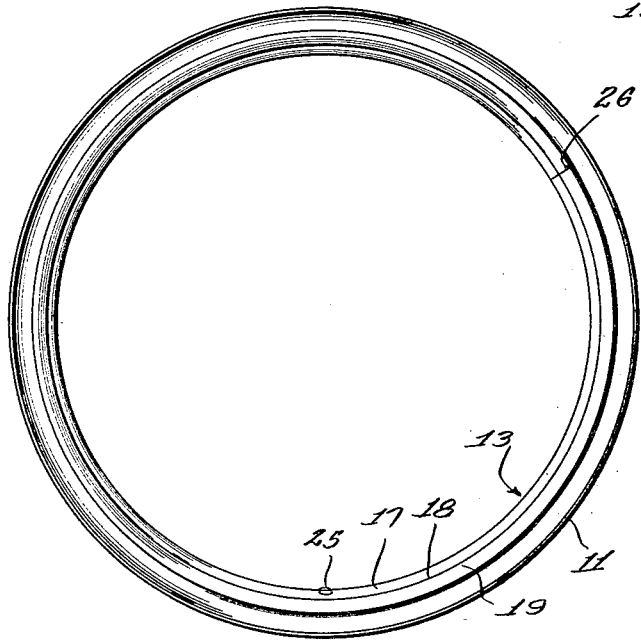
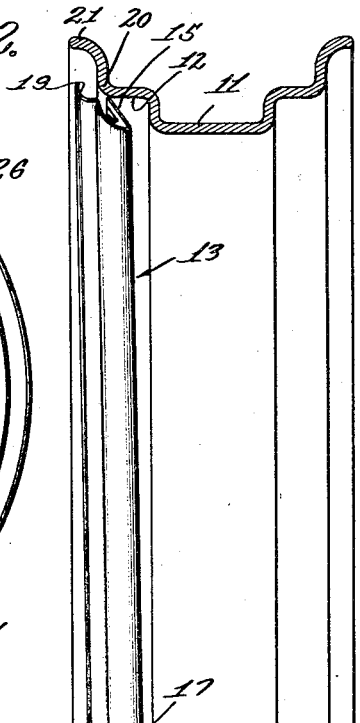
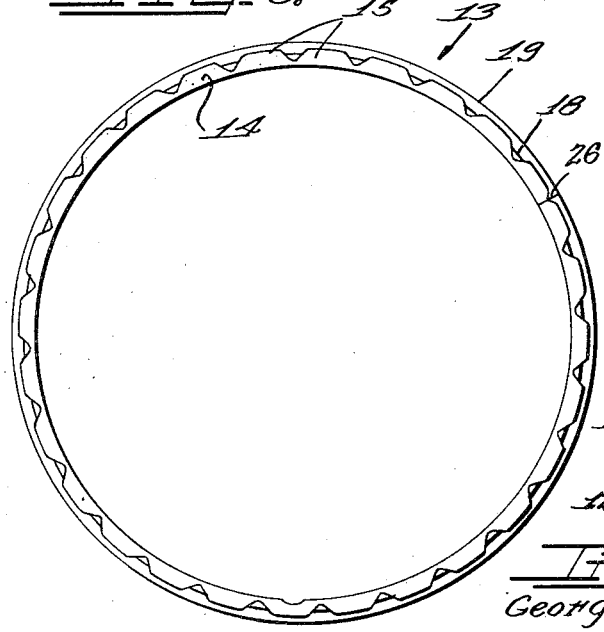
Inventor
George Albert Lyon.
by Charles W. Hills Attys.

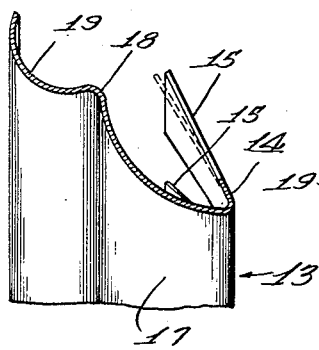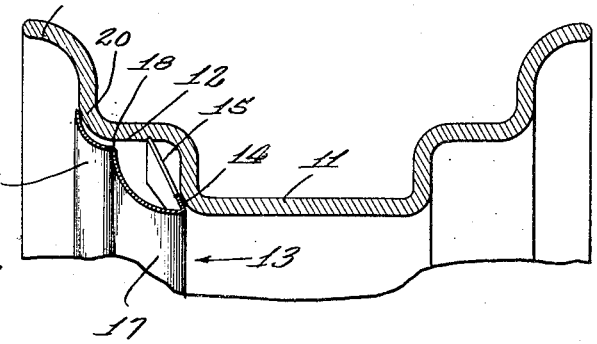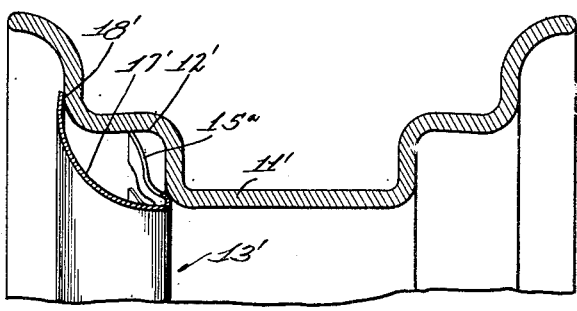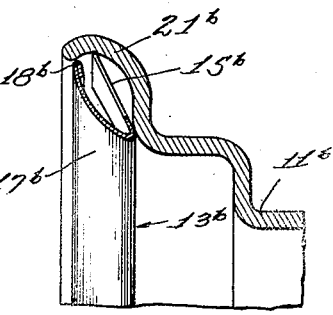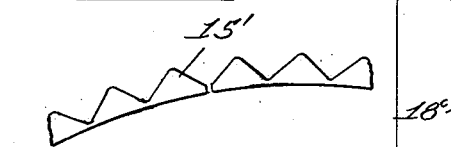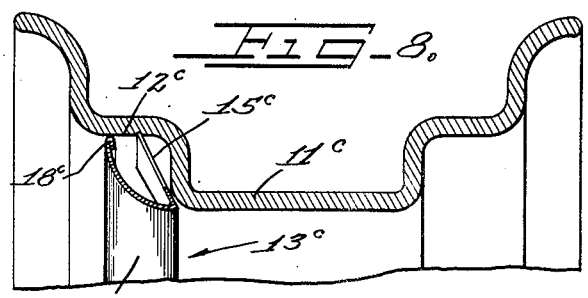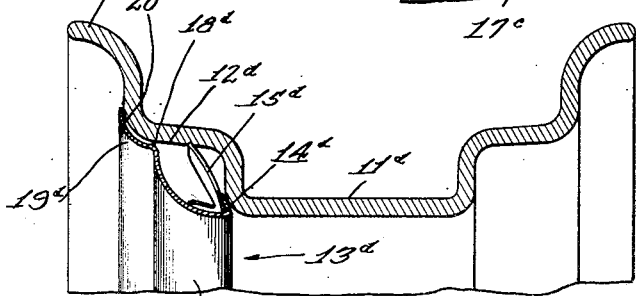

Patented Feb. 20, 1934

1,948,273

UNITED STATES PATENT OFFICE 1,948,273

ORNAMENTAL BEAD AND METHOD OF APPLYING SAME TO A WHEEL RIM

George Albert Lyon, Allenhurst, N. J.

Application October 3, 1932. Serial No. 635,932

11 Claims. (Cl. 41—10)

This invention relates to a circular ornamental beading and more particularly to an ornamental beading especially adapted to be used with wheel rims as well as to a method of applying the beading to wheel rims.

It is an object of this invention to provide an improved form of ornamental beading for use with wheel rims which beading is progressively placed into position on an outer surface of a wheel rim and is retained in such position by the biting of certain portions of the bead into the rim.

Another object of the present invention is to provide a wheel rim ornamental bead with means for causing it to be retained in position on the rim by a biting of certain portions of the bead into the surface of the rim associated therewith.

Still another object of the invention is to provide a novel method of applying the bead to the rim so that the spring back of the bead will augment the biting of certain portions of the bead into the surface of the rim thereunder.

In accordance with the general features of this invention, there is provided a circular ornamental beading of curved cross-section and including an underturned portion having a plurality of teeth for biting into a surface of the rim over which the beading is disposed; the underturned portion and its teeth being concealed by an outer curved marginal portion of the beading so positioned with respect to the underturned portion as to not interfere with the free movement of the teeth of the underturned portion into biting engagement with the rim surface.

Another feature of the invention relates to the angle of the teeth with respect to the wheel rim surface engaged thereby which angle is such that any spring back of the beading as the result of its inherent resiliency, causes such teeth to bite still further into the wheel rim surface, thereby augmenting the fastening of the beading in position on the rim.

Other objects and features of this invention will more fully appear from the following detail description, taken in connection with the accompanying drawings which illustrate several embodiments thereof, and in which Figure 1 is a side elevation of a circular beading of my invention showing it applied to a wheel rim;

Figure 2 is an enlarged vertical sectional view taken through the structure shown in Figure 1 but illustrating the ornamental bead in a position just prior to the pressing and snapping of it into fastened engagement with the wheel rim.

Figure 3 is a rear elevation of the beading showing the construction of the teeth thereon.

Figure 4 is an enlarged fragmentary cross-sectional view taken through the bead shown in Figures 1, 2 and 3, and illustrating in dotted lines the flexing of one of the teeth which occurs as it is forced into biting engagement with the wheel rim surface.

Figure 5 is an enlarged fragmentary sectional view similar to the upper part of Figure 2 but showing the ornamental bead in biting engagement with the wheel rim.

Figure 6 is an enlarged sectional view similar to Figure 5 showing a modification of the invention;

Figure 7 is also a sectional view similar to Figure 5 showing a still further modification of the invention;

Figure 8 is a sectional view similar to Figure 5 showing another modification of the invention;

Figure 9 is a sectional view similar to Figure 5 showing still another modification of the invention; and Figure 10 is a fragmentary view of a modified form of teeth which may be used in my novel ornamental beading.

As shown on the drawings:

The reference character 11 designates generally a tire rim having an annular flange-like surface 12 adapted to be engaged by a circular bead designated generally by the reference character 13 embodying the features of this invention. This rim surface 12 is relatively smooth or in other words, is not grooved and is adapted to have the bead secured thereto by reason of portions of the bead being caused to bite into this surface.

The bead 13 is illustrated in section in Figures 4 and 5 and embodies an underturned portion 14 of annular shape and including a plurality of spaced teeth 15 preferably of the configuration shown in Figure 3. These teeth, however, may be of any other suitable shape another of which shape or form of bead is shown in Figure 10 and designated by the reference numeral 15'. Furthermore, as will become more apparent with the progress of the present description, these teeth are disposed at such an angle with reference to the bead 13 that they will extend obliquely or diagonally outwardly away from the median plane of the rim 11, so that their extremities are adapted to bite into the relatively smooth surface 12 of the rim 11 as shown in Figure 5.

It will be further noted that the underturned portion 14 and the teeth 15 of the bead 13 are normally concealed by an outer convexly curved portion 17 the outermost extremity of which terminates in an annular ridge 18 slightly spaced from the rim surface 12 so as not to interfere with the free flexing of the teeth 15 into biting engagement with the surface 12. Also, this annular ridge 18 may constitute the inner extremity of a transversely curved lateral extension 19 on the bead 13 which is adapted to cover the curved outer ridge 20 of the rim portion 12 where that portion 12 terminates in an outwardly curved flange 21 of the rim 11 as best shown in Figure 5.

The application of this bead to the rim is clearly shown in Figures 2 and 5 of the drawings.

In Figure 2, the bead 13 is shown as having been pressed at its lower half into the rim prior to the pressing of the upper half of the bead into position within the rim. Of course, it will be appreciated that the bead may be made of any suitable resilient material such, for example, as steel and it is of such a diameter that the pressing of it into position inside of the annular rim surface 12 causes it to be slightly contracted as a result of which the bead after it is in position tends to spring back thus causing the extremities of the teeth 15 which are flexible to bite into the rim surface 12 as shown in Figure 5. The teeth 15 are adapted in the process of pressing the bead into position to be flexed, for example, as illustrated in Figure 4 by dotted lines, showing the position of one of the teeth 15. Once the bead is in position any tendency to dislodge it either due to the resiliency of the bead or due to vibration of the rim causes the teeth to more firmly bite into the surface 12; this action being made possible by the oblique angle of the teeth. Thus, there is provided a bead for the tire rim which is retained in position on the rim solely by reason of its particular engagement with the rim and in the present instance by reason of the biting action of the teeth 15 on the wheel rim surface 12 which biting action is enhanced by any tendency of the bead 13 to spring back out of position or to become dislodged from the wheel rim.

In Figure 6 I have illustrated a modified form of the invention. The bead 13' does not have an extension 19 but rather instead, the outer curved portion 17' has a marginal edge 18' which terminates adjacent the rim. Also, the teeth 15ᵃ in this form of the invention have a slight bend in them instead of being straight as is the case with the teeth 15 of the first described form of the invention. Furthermore, these teeth 15ᵃ are adapted to cooperate with a slightly inclined rim surface 12' instead of a substantially straight surface 12 as shown in the first form of the invention. With the exception of these differences, the bead 13' cooperates with the wheel rim in substantially the same manner as the first described form of the invention.

In the form of the invention shown in Figure 7, the bead 13ᵇ instead of being disposed in cooperation with the horizontal surface of the wheel rim, is disposed in cooperation with an outer curved flange 21ᵇ of the wheel rim 11ᵇ. As shown, the teeth 15ᵇ of this bead 13ᵇ are disposed for biting engagement with an inner surface of the marginal flange 21ᵇ of the rim and the teeth are normally concealed by an outer transversely curved portion 17ᵇ terminating at its inner extremity in the underturned concealed teeth 15ᵇ and at its outer extremity in a turned edge 18ᵇ positioned adjacent the tip of the flange 21ᵇ.

This form of bead is applied to the wheel rim by pressing it into position inside of the flange 21ᵇ so that the teeth 15ᵇ may bite into the surface of that flange. The operation of applying this form to the wheel rim is substantially the same as that of the previously described embodiments of the invention.

In the still further embodiment of the invention shown in Figure 8, the ornamental bead 13ᶜ is disposed substantially wholly within the space defined by the annular rim surface 12ᶜ of the rim 11ᶜ.

This bead 13ᶜ has teeth 15ᶜ for biting into the surface 12ᶜ, which teeth are normally concealed by an outer transversely curved portion 17ᶜ terminating in a turned edge 18ᶜ disposed in close proximity to the surface 12ᶜ. Since the application of this bead to the rim is substantially the same as the application of the other forms of bead to the rims in the previously described embodiments of the invention, it is thought that no further description of this specific embodiment is necessary.

In the last embodiment of the invention shown in Figure 9, the teeth 13ᵈ cooperate with the surface 12ᵈ of the wheel rim 11ᵈ in substantially the same manner as the bead 13 cooperates with the surface 12 of the rim 11, with the exception that the teeth 15ᵈ of this form of the invention constitute a separate strip of material positioned inside of the main body of the bead. In other words, the ring-like strip of teeth 15ᵈ may be made of any suitable material, such for example, as stainless steel and may be disposed inside of the bead proper with its inner edge in cooperation with the inwardly turned margin 14ᵈ of the bead. This structure is advantageous since it enables the teeth to be made of stainless steel and the remaining structure of the bead to be made of a less expensive form of material.

The teeth 15ᵈ are concealed by the outer transversely curved portion 17ᵈ which terminates at its outermost extremity in the annular ridge 18ᵈ disposed between the portion 17ᵈ and the transversely curved outer extension 19ᵈ located over the curved junction 20ᵈ between the surface 12ᵈ and the flange 21ᵈ of the rim 11ᵈ.

Also, it should be noted that in this form of the invention, the surface 12ᵈ of the wheel rim 11ᵈ is slanted in an opposite direction from the slant of the surface 12' of the form of the invention shown in Figure 6.

In the application of this form of the invention to the rim, the strip containing the teeth 15ᵈ is snapped into position between the outer curved portion 17ᵈ and the underturned margin 14ᵈ and thereafter the bead 13ᵈ is pressed into position in the wheel rim in the same way as was described in connection with the first form of the invention.

It should also be noted that each of these forms of my invention may be cut away as indicated at 25 so as to accommodate the valve stem of the inner tube when the tire is mounted on the rim 11.

Then, too, in each of these forms of the invention the ornamental bead may be provided with any suitable decorative matter such, for example, as a chromium plating on its outer surface so as to enhance the appearance of the rim to which it is applied.

The bead may be fabricated by any suitable rolling machinery or the like and may be first made in strip form and thereafter fabricated into the form of a circle with its ends in abutment as shown at 26 in Figure 1. While this bead may be in the form of a split ring, it is preferably in the form of a continuous circle with the ends suitably joined together by any suitable means such, for example, as by rivet or spot-weld connections.

Moreover, while the bead is preferably made of some metallic material, I do not propose limiting my invention to such material since it is, of course, evident that the bead may be made of other suitable material, or may be made of a combination of material such, for example, as of metal and rubber or the like.

It is thought that my novel method of applying an ornamental bead to an object or rim will be fully understood from the aforesaid description of the different forms of ornamental bead for use in practicing my novel method.

Now I desire it understood that although I have illustrated and described in detail the preferred embodiment of this invention, the invention is not to be thus limited but only insofar as defined by the scope and spirit of the appended claims.

I claim as my invention:

1. The combination of a wheel rim of an ornamental bead therefor of curved cross section and having tight cooperation with the rim solely by its engagement with the rim, said bead including a normally concealed marginal portion for resiliently engaging said rim, and an outer marginal portion having its edge slightly spaced from the rim so as not to interfere with the flexing of said concealed marginal portion into engagement with the rim, said concealed marginal portion including means for biting into the adjoining surface of the rim actuated by the resiliency of the bead.

2. The combination with a wheel rim of an ornamental bead therefor of curved transverse cross section and held in tight cooperation with the rim by its engagement with the rim, said bead including a normally concealed portion for resiliently engaging said rim and comprising a plurality of spaced flexible teeth normally concealed by an outer portion, which portion is maintained out of engagement with the rim so as not to interfere with the flexing of the teeth into engagement with the rim, said teeth being disposed to bite into the adjoining surface of the rim after the beading is in position, and said biting action being effected by the inherent resiliency of the beading.

3. The combination with a wheel rim of an ornamental circular bead having an underturned portion in engagement with a surface of the rim and an outer curved marginal portion which is slightly spaced from the rim so as not to offer any resistance to the free movement of the underturned portion into engagement with the said surface, and said underturned portion being so disposed as to be actuated into biting engagement with said surface by the inherent tendency of the beading to spring out of position on the rim.

4. The combination with a wheel rim of an ornamental circular bead disposed so as to overlie the surface of the rim and having an underturned portion in engagement with said surface and an outer marginal portion which is slightly spaced from the wheel rim so as not to interfere with the free movement of the underturned portion into engagement with said surface, said underturned portion including a plurality of spaced resilient means adapted to be drawn outwardly from the rim into biting engagement with said surface by the resiliency in spring-back of the beading.

5. The combination with a wheel rim of an ornamental circular bead for overlying a relatively smooth surface of the rim and having an underturned portion for engagement with said surface and an outer curved marginal portion which is slightly spaced from the rim so as not to offer any resistance to the movement of said underturned portion into engagement with said surface, said beading being held in tight engagement with said wheel rim surface by the resilient tendency of the beading to spring out of position on said surface whereby said underturned portion is caused to bite into said smooth rim surface.

6. The combination with a wheel rim having on its inner side a relatively smooth surface of an ornamental circular bead disposed over said surface so as to overlie the same and having an underturned portion urged outwardly in a direction away from the median plane of the rim into biting engagement with said surface so as to anchor the beading thereto.

7. The combination with a wheel rim having on its inner side a relatively smooth surface of an ornamental circular bead disposed over said surface so as to overlie the same and having an underturned portion urged outwardly in a direction away from the median plane of the rim into biting engagement with said surface so as to anchor the beading thereto, said biting action being augmented by the inherent resiliency of the bead tending to cause the bead to snap out of position on said rim.

8. An automobile wheel rim including a base and side flanges, said base having a relatively smooth annular surface, and an annular ornamental member partially concealing one of said flanges and including a plurality of spaced teeth disposed to bite into said surface.

9. The combination with a wheel rim of an ornamental bead therefor curved transversely in cross section and held in tight cooperation with the rim solely by its engagement with the rim, said bead including a normally concealed marginal portion for biting into a smooth surface of the rim.

10. An automobile wheel rim including a base and side flanges, said base having a relatively smooth annular surface, and an annular ornamental member partially concealing one of said flanges and including a plurality of spaced teeth disposed to bite into said surface, said teeth being formed in a separate strip of resilient material disposed behind and interlocked with the main body of said ornamental member.

11. The combination with a wheel rim of an ornamental bead therefor curved transversely in cross section and held in tight cooperation with the rim solely by its engagement with the rim, said bead including a normally concealed marginal portion for biting into a smooth surface of the rim, and which marginal portion is in the form of a separate strip of material disposed behind and in nesting relation with said bead.

GEORGE ALBERT LYON.